(12) United States Patent
Beale et al.

(10) Patent No.: US 10,966,174 B2
(45) Date of Patent: Mar. 30, 2021

(54) METHODS AND APPARATUSES FOR COMMUNICATING POSITION REFERENCE SIGNALS

(71) Applicant: Sony Corporation, Tokyo (JP)

(72) Inventors: Martin Warwick Beale, Basingstoke (GB); Shin Horng Wong, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/323,265

(22) PCT Filed: Aug. 9, 2017

(86) PCT No.: PCT/EP2017/070231
§ 371 (c)(1),
(2) Date: Feb. 5, 2019

(87) PCT Pub. No.: WO2018/029269
PCT Pub. Date: Feb. 15, 2018

(65) Prior Publication Data
US 2020/0196271 A1 Jun. 18, 2020

(30) Foreign Application Priority Data
Aug. 12, 2016 (EP) .................................... 16183980

(51) Int. Cl.
*H04W 4/029* (2018.01)
*H04W 64/00* (2009.01)
(Continued)

(52) U.S. Cl.
CPC .......... *H04W 64/003* (2013.01); *H04B 1/713* (2013.01); *H04L 5/0048* (2013.01);
(Continued)

(58) Field of Classification Search
CPC ......... H04W 4/029; H04W 4/70; H04W 8/00; H04W 24/02; H04W 24/04; H04W 24/10;
(Continued)

(56) References Cited

U.S. PATENT DOCUMENTS 6,573,761 B1 6/2003 Macdonald et al.
2001/0055320 A1* 12/2001 Pierzga ................. H04L 1/0069
370/480
(Continued)

FOREIGN PATENT DOCUMENTS

EP 0 757 463 A2 2/1997

OTHER PUBLICATIONS

3GPP, "LTE; Evolved Universal Terrestrial Radio Access (E-UTRA); Requirements for support of radio resource management", 3GPP TS 36.133 Version 13.3.0, Release 13, May 2016, 1582 pages.
(Continued)

*Primary Examiner* — Jean A Gelin
(74) *Attorney, Agent, or Firm* — Xsensus LLP

(57) ABSTRACT

Infrastructure equipment for transmitting data to and receiving data from a mobile device on a communications network is described. The infrastructure equipment comprising: transmitter circuitry configured to transmit the data to the mobile device; and controller circuitry configured to control the transmitter circuitry to transmit a first position reference signal in a first subframe and a second position reference signal in a second subframe, wherein the second position reference signal is a time adjusted version of the first position reference signal, the amount of time adjustment being determined by the sample time at which the mobile device samples the position reference signal.

12 Claims, 11 Drawing Sheets

(51) Int. Cl.
*H04B 1/713* (2011.01)
*H04L 5/00* (2006.01)
*H04L 27/26* (2006.01)
*H04W 72/04* (2009.01)

(52) U.S. Cl.
CPC ........ *H04L 5/0053* (2013.01); *H04L 27/2613* (2013.01); *H04W 4/029* (2018.02); *H04W 72/042* (2013.01)

(58) Field of Classification Search
CPC ... H04W 28/00; H04W 52/226; H04W 64/00; H04W 84/045; H04W 88/02; H04W 26/32; H04W 64/003; H04W 72/042; H04L 5/0048; H04L 5/0053; H04L 27/2613; H04B 1/713; H04B 15/00; H04B 17/318
See application file for complete search history.

(56) References Cited

U.S. PATENT DOCUMENTS

| | | | |
|---|---|---|---|
| 2004/0071200 A1* | 4/2004 | Betz | G01S 19/30 375/152 |
| 2010/0177852 A1* | 7/2010 | Li | H04L 27/2662 375/340 |
| 2011/0274220 A1 | 11/2011 | Andgart et al. | |
| 2013/0238232 A1* | 9/2013 | Choi | G08G 3/02 701/301 |
| 2014/0092761 A1* | 4/2014 | Behravan | H04W 24/00 370/252 |
| 2014/0301278 A1* | 10/2014 | Ghosh | H04W 28/0289 370/328 |
| 2017/0064692 A1* | 3/2017 | Kahtava | H04L 27/0006 |
| 2018/0020423 A1* | 1/2018 | Wang | H04L 5/0048 |
| 2018/0049192 A1* | 2/2018 | Beale | H04B 7/0617 |
| 2018/0132189 A1* | 5/2018 | Sundararajan | H04W 52/265 |
| 2019/0053013 A1* | 2/2019 | Markhovsky | H04W 4/025 |
| 2019/0098622 A1* | 3/2019 | Lee | H04W 72/0446 |
| 2019/0360816 A1* | 11/2019 | Chen | G01C 21/28 |

OTHER PUBLICATIONS

Ericsson, "New WI proposal on Further Enhanced MTC", 3GPP TSG RAN Meeting No. 72 RP-161321 revision of RP-161319, Busan, Korea, Jun. 13-16, 2016, 7 pages.

Vodafone, Huawei, Hisilicon, Ericsson, Qualcomm, "New work item proposal: Enhancements of NB-IoT", 3GPP TSG RAN Meeting No. 72 RP-161324, Busan, Korea, Jun. 13-16, 2016, 8 pages.

LG Electronics, "Consideration on the PRS channel bandwidth and tightening of the RSTD accuracy requirements for emergency situations", 3GPP TSG RAN WG4 Meeting No. 63 R4-12581, Prague, Czech Republic, May 21-25, 2012, 5 pages.

International Search Report dated Nov. 8, 2017 for PCT/EP2017/070231 filed on Aug. 9, 2017, 12 pages.

\* cited by examiner (1)

(2)

(3)

METHODS AND APPARATUSES FOR COMMUNICATING POSITION REFERENCE SIGNALS

CROSS-REFERENCE TO RELATED APPLICATIONS

The present application is based on PCT filing PCT/EP2017/070231, filed Aug. 09, 2017, and claims priority to 16183980.8, filed in the European Patent Office on Aug. 12, 2016, the entire contents of each of which being incorporated herein by reference.

TECHNICAL FIELD OF THE DISCLOSURE

The present disclosure relates to infrastructure equipment, telecommunications devices and methods

BACKGROUND OF THE DISCLOSURE

The "background" description provided herein is for the purpose of generally presenting the context of the disclosure. Work of the presently named inventors, to the extent it is described in this background section, as well as aspects of the description which may not otherwise qualify as prior art or may not form part of the state of the art at the time of filing, are neither expressly or impliedly admitted as prior art or state of the art against the present invention.

Mobile (or wireless) telecommunication systems, such as those based on the Third Generation Project Partnership (3GPP) defined Universal Mobile Telecommunication System (UMTS) and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as video streaming and video conferencing on mobile communications devices that would previously only have been available via a fixed line data connection.

The demand to deploy fourth generation networks is therefore strong and the coverage area of these networks, i.e. geographic locations where access to the networks is possible, is increasing rapidly and expected to continue to increase. However, although the coverage and capacity of fourth generation networks is expected to significantly exceed those of previous generations of communications networks, there are still limitations on network capacity and the geographical areas that can be served by such networks. These limitations may, for example, be particularly relevant in situations in which networks are experiencing high load and high-data rate communications between communications devices, or when communications between communications devices are required but the communications devices may not be within the coverage area of a network.

The anticipated widespread deployment of third and fourth generation networks has led to the parallel development of a number of new infrastructure architectures involving a variety of classes of devices, of wireless access point units and of applications which may require different data rates, coverage areas or transmission powers. Although there are applications which require high data rates to support their operation, there are some applications in which high data rates are not required. Indeed there are some applications which are expected to be provided by more simple, less complicated communications devices such as those supporting machine type communications (MTC). Such devices are also expected to be low power devices having applications which tend to be low-throughput and high-latency, and may include a relatively inexpensive low complexity transmitter and receiver. Such devices may also be deployed in locations in which radio communications conditions can make transmission and reception of signals more difficult. MTC applications are typified by semi-autonomous or autonomous wireless communication devices (i.e. MTC devices) communicating small amounts of data on a relatively infrequent basis. Examples include so-called smart meters which, for example, are located in a customer's house and periodically transmit information back to a central MTC server data relating to the customers consumption of a utility such as gas, water, electricity and so on. Other examples may include relay nodes which provide assistance to local terminals communicating with a base station.

3GPP has completed two Rel-13 Work Items on Internet of Things (IoT) namely, eMTC (Enhanced Machine Type Communications) and NB-IoT (Narrowband Internet of Things). These Work Items aimed at creating low cost devices that are power efficient and can operate in extended coverage e.g. such as inside basements.

In Rel-14, 3GPP agreed to enhance these types of IoT devices thereby introducing two Work Items namely, Rel-14 eNB-IoT (enhanced NB-IoT) [1] and Rel-14 fe-MTC (Further Enhanced MTC) [2]. One of the common objectives in these two WIs is positioning, which allows IoT devices to be tracked.

One of the positioning techniques considered for IoT (i.e. eNB-IoT and fe-MTC) is Observed Time Difference Of Arrival (OTDOA), where the User Equipment (UE), which may be an IoT device, an MTC device, or any kind of terminal device, measures the Reference Signal Time Difference (RSTD), i.e. the observed time difference between a target enhanced Node B (eNB) and a reference eNB. This is illustrated in FIG. 1. The UE 100 measures RSTD for two or more eNBs (i.e. involving 3 or more eNBs since one of them is the reference eNB) and sends these measurements to a Location Server 110 which is part of the core network. So, in the context of FIG. 1, the reference eNB is eNB1 105A, and the two or more eNBs are eNB2 105B and eNB3 105C. The Location Server 110 calculates the UE 100 position based on these RSTD measurements using the known location of the eNBs involved. That is, the Location Server performs a triangulation (involving at least 3 eNBs) to determine the UE location as shown in FIG. 1.

The accuracy of the UE 100 position is dependent upon the accuracy of the measured RSTD. For example, in FIG. 1, the time of arrival from eNB1 has an accuracy of $\Delta T_1$, the time of arrival of eNB2 has an accuracy of $\Delta T_2$ and the time of arrival for eNB3 has an accuracy of $\Delta T_3$. The accuracy of the time of arrival measurement is dependent upon the quality of the measured Reference Signal and the bandwidth of the Reference Signal.

The time of arrival can be estimated using a known signal, i.e. Reference Signals such as Cell-Specific Reference Signals (CRS), Primary Synchronisation Signals (PSS) or Secondary Synchronisation Signals (SSS). However, these reference signals (more generally "RS") experience inter-cell interferences and hence in LTE Rel-9, Positioning Reference Signals (PRS) were introduced.

FIG. 2 shows the RE (Resource Element) location of a set of PRS for an eNB within a Physical Resource Block (PRB) and the location occupied is dependent upon the eNB's Cell ID. Up to 6 different sets of PRS locations with different frequency shifts can be transmitted, hence up to 6 different eNBs can be measured at a time (assuming one eNB per frequency shift). It should be noted that the eNBs sharing the same frequency shift would have different sequences to distinguish among themselves. The PRS is transmitted over $N_{PRS}=\{1, 2, 4, 6\}$ consecutive subframes with a period of $T_{PRS}=\{160, 320, 640, 1280\}$ subframes. The $N_{PRS}$ consecutive subframes of PRS transmission is known as the Positioning Occasion. An example of the Positioning Occasion and the period $T_{PRS}$ are shown in FIG. 3, where the Positioning Occasion has length $N_{PRS}=4$ subframes and occupies subframe 1, 2, 3 & 4.

NB-IoT and eMTC devices are low complexity devices. One route to achieving low complexity is to operate with a narrow bandwidth and a low sampling rate. However, the low sampling rate reduces the accuracy with which the position of a UE can be determined. The relationship between distance error, $\varepsilon_d$, and time error, $\varepsilon_T$, for a position derived from an RSTD measurement is (where 'c' is the speed of light):

$$\varepsilon_d = c \times \varepsilon_T$$

For a sampled signal, the time error is related to the sampling time. eMTC is a 1.4 MHz bandwidth system and a UE typically uses a sampling rate of 1.92 MHz (sample time=0.52 μs). NB-IoT is a 180 kHz bandwidth system with a typical sampling rate of 320 kHz. Hence the position inaccuracy of these systems, due to the sampling rate, are:

eMTC: $\varepsilon_d=156$ m

NB-IoT: $\varepsilon_T=937$ m

There are several possible implementations for deriving an RSTD measurement from a received signal, including correlation based techniques and techniques that create a time-domain channel impulse response.

FIG. 4 shows an example architecture 400 of a UE that creates a time domain channel impulse response in order to derive RSTD measurements. Based on the channel impulse response produced by the IFFT functions, the UE can estimate the arrival times, $T_{eNB1}$, $T_{eNB2}$, ... $T_{eNB6}$ of the signals from each eNB in the positioning set. RSTD measurements may then be derived based on these arrival time estimates.

In the example architecture 400 of FIG. 4, the PRS is received by antenna 405. The received signal is fed into a Radio Frequency Front End module 410. This amplifies, filters, downconverts and samples the received signal as would be appreciated by the skilled person. The sampled signal is fed into a Fast Fourier Transform (FFT) module 415. This produces a frequency domain representation of the received waveform from which the PRS signal can be extracted, as would be appreciated by a skilled person. The PRS signal from the output of the FFT module 415 is fed to an array of channel estimator modules (420A ... 420N). In this discussion of the known system, there are six channel estimator modules in the array (one for each of the six eNBs whose PRS can be measured). Of course, any number is envisaged.

Referring back to FIG. 4, the output of each of the channel estimator modules 420A ... 420N is fed into an Inverse Fast Fourier Transform (IFFT) module 425A ... 425N. Each of these IFFT modules produces a channel impulse response for that particular eNB in the time domain. An example output of one of the IFFT modules 425A is shown in FIG. 5 as will be explained later. These channel impulse responses are provided to an RSTD calculation module 430 which calculates the RSTD for each eNB using a known technique and sends these calculations to the Positioning Server which determine the position of the UE.

In the architecture of FIG. 4, the UE produces channel impulse responses of the form shown in FIG. 5. The accuracy with which the channel impulse response can be resolved in the time domain is shown to be a function of the sampling rate of the system. For low sample rate systems, such as eMTC and NB-IoT, the accuracy of the determined channel impulse responses is compromised compared to systems operating at higher sample rates. This is primarily because by sampling at a low rate, the UE is more likely to miss the peak amplitude of the channel impulse response and it is the peak amplitude which is one mechanism to identify the distance to the eNB sending the PRS. Of course, and as would be appreciated, there are other methods of determining the distance to the eNB such as determining the time location of the first path in the channel impulse response that is greater than a threshold.

This is shown diagrammatically in FIG. 5, where a UE with a basic sample time $T_s$ is shown in graph 1, a UE with a sample time of $2T_s$ is shown in graph 2 and a UE with a sample time of $T_s/2$ is shown in graph 3.

However, it is undesirable to increase the sample rate within the UE (especially eMTC and NB-IoT type devices) because this increases the battery consumption and the complexity of the device. Therefore, it is desirable to improve the accuracy of positioning for eMTC and NB-IoT, without increasing device complexity (i.e. without increasing the sampling rate of the device).

It is an aim of the present disclosure to address this issue.

SUMMARY OF THE DISCLOSURE

Various aspects and features of the present technique are defined in the appended claims.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts, and wherein.

DESCRIPTION OF EXAMPLE EMBODIMENTS

Figure 1:
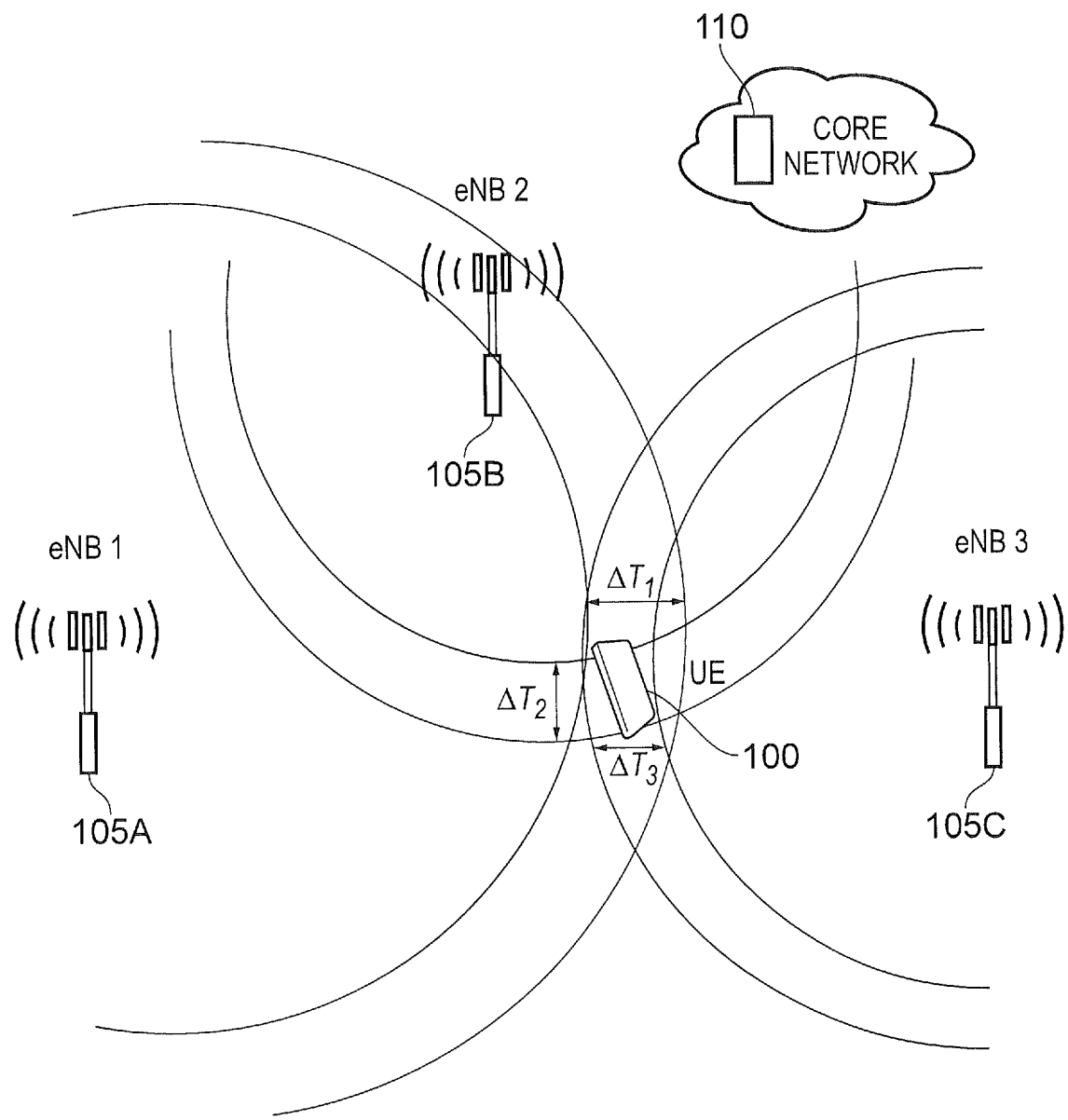
FIG. 1 shows a schematic explaining positioning of a UE using triangulation.
Figure 2:
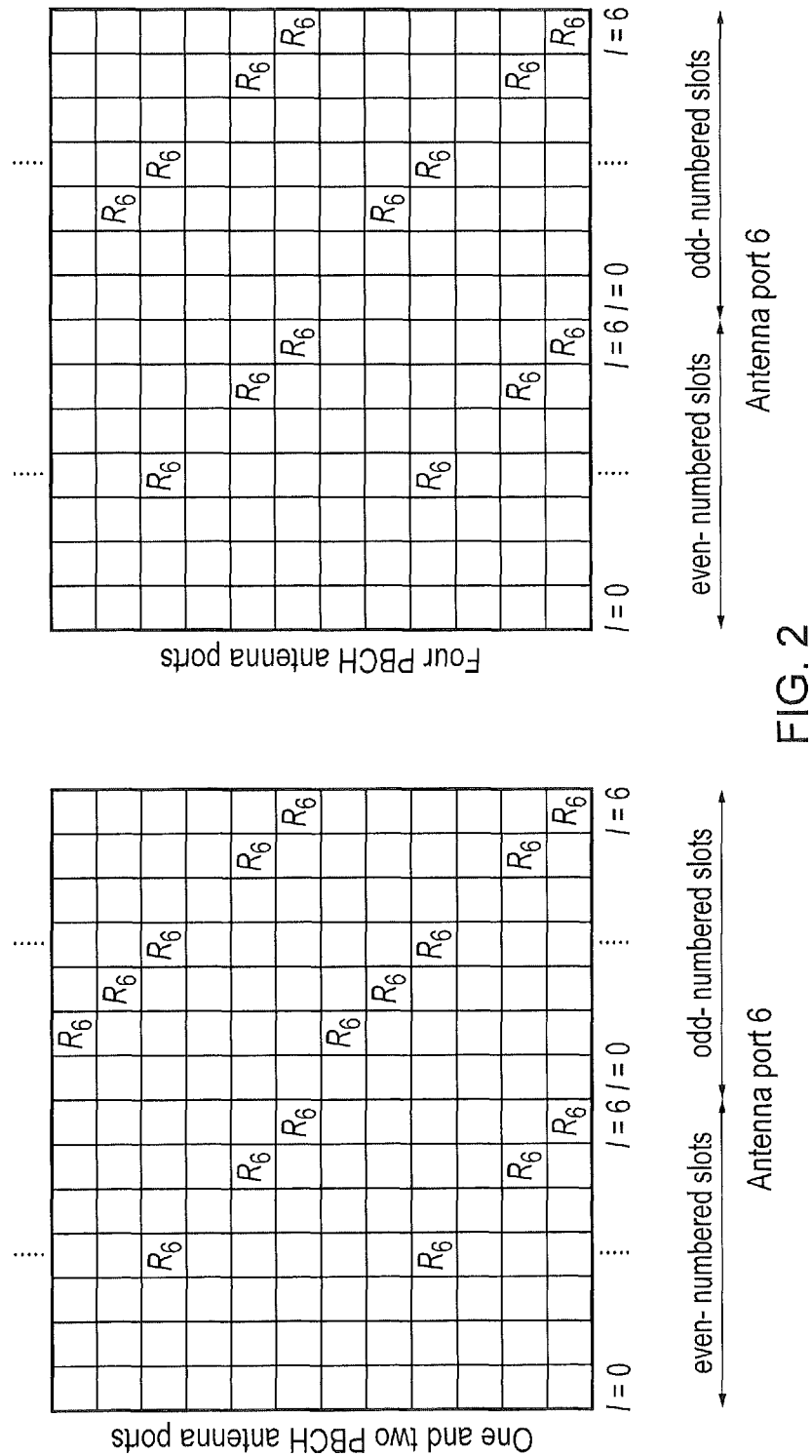
FIG. 2 shows a schematic explaining the position of a PRS signal in a PRB.
Figure 3:
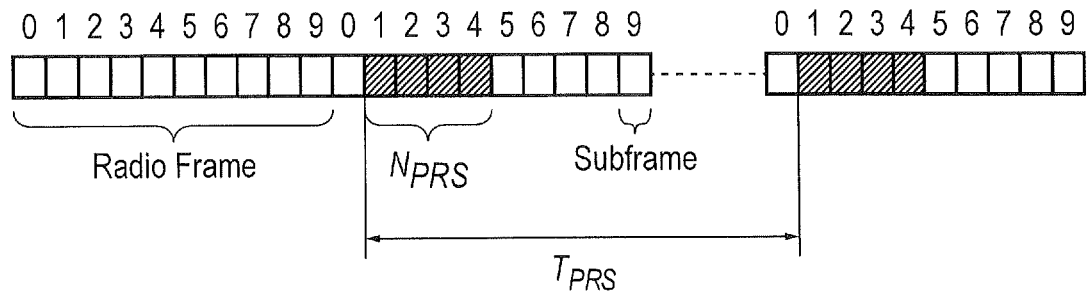
FIG. 3 shows a schematic explaining the positioning occasion and period.

Hereinafter preferred embodiments of the present technique will be described in detail with reference to the appended drawings. Note that, in this specification and appended drawings, structural elements that have substantially the same function and structure can be denoted with the same reference numerals, and repeated explanation of these structural elements may be omitted.

Mobile Telecommunications System

Figure 6:
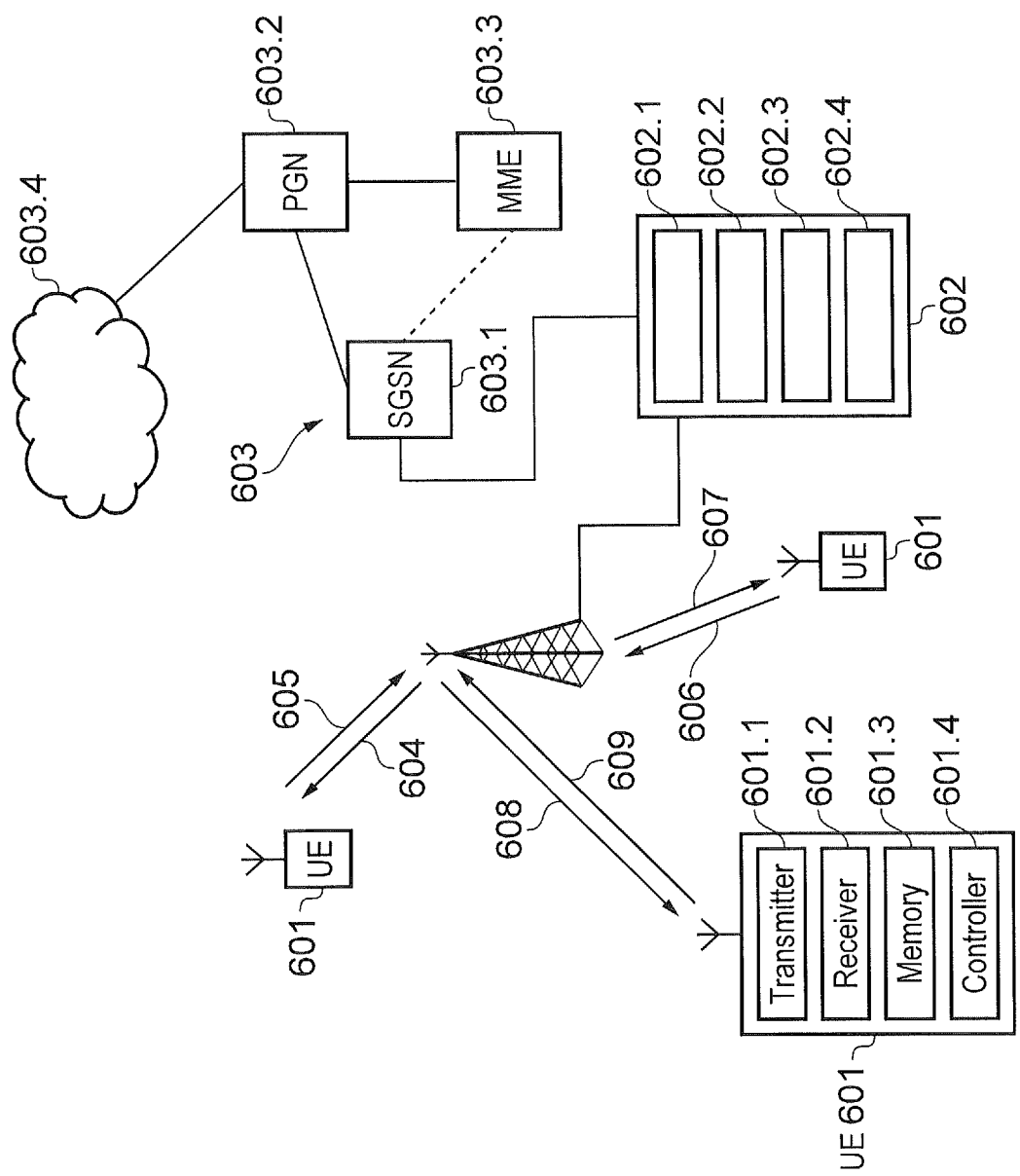
FIG. 6 provides a schematic diagram of a mobile communications system.

FIG. 6 provides a schematic diagram of a mobile telecommunications system 600, where the system includes mobile communications terminals 601, infrastructure equipment 602 and a core network 603. In this example embodiment, the core network 603 will include the positioning server. The infrastructure equipment may also be referred to as a base station, network element, enhanced Node B (eNodeB) or a coordinating entity for example, and provides a wireless access interface to the one or more communications terminals within a coverage area or cell. The one or more mobile communications terminals may communicate data via the transmission and reception of signals representing data using the wireless access interface. The network entity 602 is communicatively linked to core network components such as a serving gateway support node 603.1, a packet data gateway 603.2, a mobility management entity 603.3, and an external network 603.4, which may be connected to one or more other communications systems or networks which have a similar structure to that formed from communications terminals 601 and infrastructure equipment 602. Infrastructure equipment 602 (sometimes called an eNB) includes a transmitter 602.1, a receiver 602.2, a memory 602.3 and a controller 602.4. The transmitter 602.1 is configured to periodically send the PRS signal (or any type of signal that provides a position reference) to the mobile communication terminal 601. The timing of the transmission is controlled by the controller 602.4.

The core network may also provide functionality including authentication, mobility management, charging and so on for the communications terminals served by the network entity. The mobile communications terminals of FIG. 6 may also be referred to as communications terminals, user equipment (UE), terminal devices and so forth, and are configured to communicate with one or more other communications terminals served by the same or a different coverage area via the network entity. These mobile communications terminals (sometimes called UEs) 601 each include a transmitter 601.1, a receiver 601.2, a memory 601.3 and a controller 601.4. These communications may be performed by transmitting and receiving signals representing data using the wireless access interface over the two way communications links represented by lines 604 to 609, where 604, 606 and 608 represent downlink communications from the network entity to the communications terminals and 605, 607 and 609 represent the uplink communications from the communications terminals to the network entity. The PRS signal will be sent in the downlink signal. Additionally, as would be appreciated, the UE 601 transmits an indication (for example, capability signalling) to the eNB 602. From the type of UE, the eNB 602 knows the sample rate at which the UE 601 samples the PRS signal. For example, for capability signalling indicating that the UE is an MTC type device, the sampling rate is a function of its system bandwidth. Therefore, as the network knows the type of UE, the sampling rate would be known to the network. That is, the capability signalling indicates to the eNB the sampling rate and sampling time of the UE. This will be appreciated by the skilled person.

The communications system 600 may operate in accordance with any known protocol, for instance in some examples the system 600 may operate in accordance with a 3GPP Long Term Evolution (LTE) standard where the network entity and communications terminals are commonly referred to as eNodeB and UEs, respectively.

In a broad sense, embodiments of the disclosure provide that the UE 601 samples the PRS at a low sample rate across multiple subframes and the eNB adjusts the timing of the transmitted PRS signal with a finer granularity than the UE's known sampling rate. As the UE 601 is provided with information indicating when (i.e. in which subframes) the eNB 602 adjusts its timing, the UE thus builds a more accurate sampling of the channel impulse response using different copies of the received sample signal.

The transmission timing adjustments of all the measured eNBs in the positioning set must be known. It is therefore desirable if these timing adjustments are synchronised. However, this is not a requirement of the disclosure as would be apparent.

The eNB 602 may notify the UE 601 of the timing adjustments applied in the different subframes during configuration of the positioning parameters. Alternatively, these may be specified a priori (for example in LTE specifications). In other embodiments, it is possible that the UE 601 may have stored adjustment patterns within the memory 601.3 and the eNB 602 may simply indicate to the UE 601 which stored pattern to use.

Figure 7:
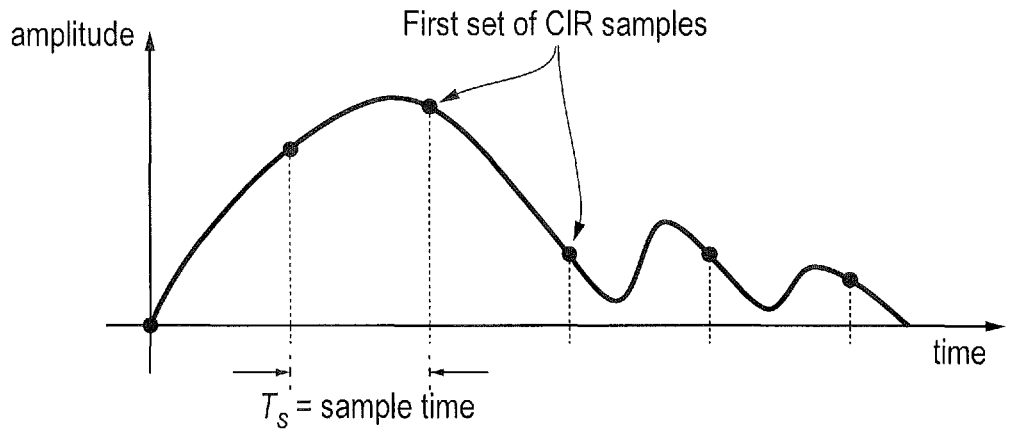
FIG. 7 shows a shifted and also combined channel impulse response according to embodiments.
Figure 7:
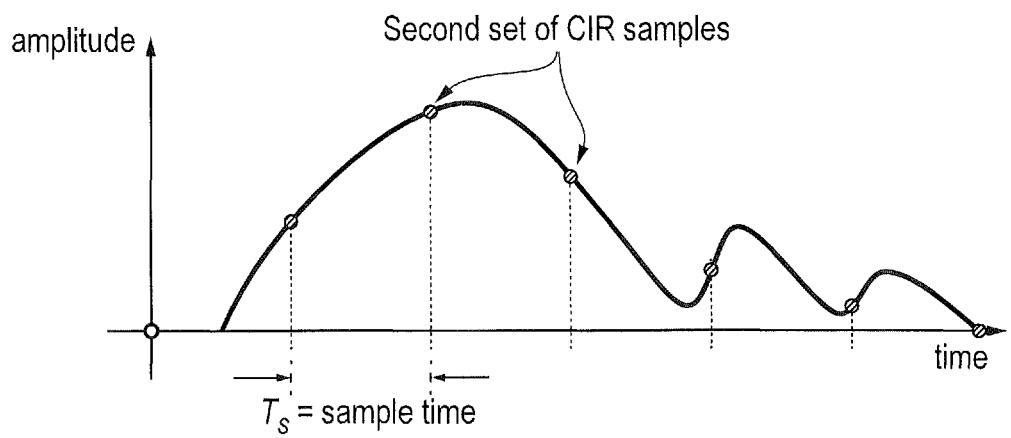
Figure 7:
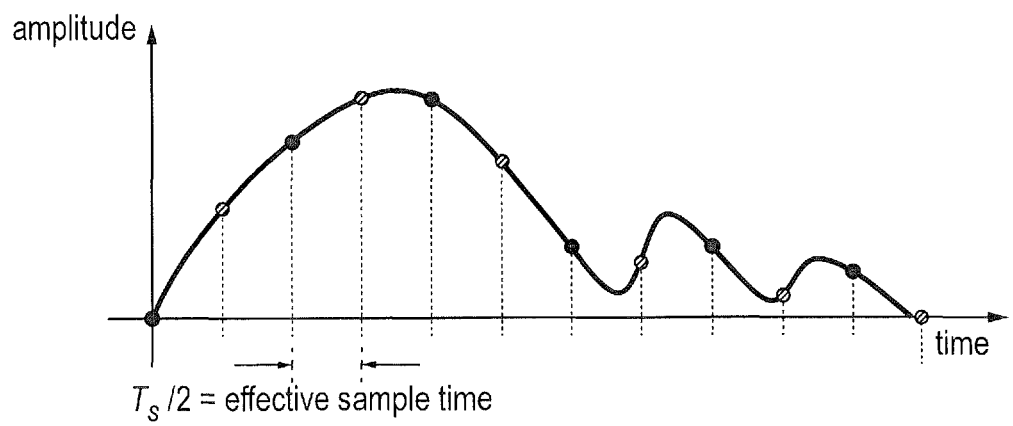

In one implementation, the controller 602.4 of the eNB 602 cyclically increases its timing adjustment. For example for a UE sample period of Ts, and for two timing adjustments, the timing of the PRS transmissions from the eNB 602 are:

Subframe n: no adjustment
Subframe n+1: retard the PRS by Ts/2
Subframe n+2: no adjustment FIG. 7 shows how the UE 601 samples the non-adjusted and timing-adjusted signals from the eNB 602 in order to create a composite channel impulse response with an effective sample period of Ts/2 (when the native sampling period of the UE is Ts). In graph 1 of FIG. 7, the channel impulse response sampled with a sample time Ts and with no time adjustment applied by the eNB 602 is shown. In graph 2, the channel impulse response sampled at time Ts and with a time adjustment of Ts/2 applied by the eNB 602 is shown. Finally in graph 3, the channel impulse response of the combined sampled channel impulse response is shown. It is evident from graph 3, that a finer granularity of RSTD measurement can be obtained from the shifted and combined channel impulse response shown since the effective sample time of graph 3 is Ts/2. In other words, by applying the time adjustment of the PRS at the eNB 602, the effective sample time is of the UE 601 is decreased. This improves the RSTD measurement. It should be noted here that in this case, the arrival time of a single eNB would effectively be the provision (for example, generation) of the combined signal. The RSTD would be calculated on the basis of at least three of these provisioned signals.

Although only a single time adjustment is applied, the skilled person would appreciate any number of time adjustments may be applied. For example, in the event that two time adjustments are applied (i.e. the eNB 602 sends a PRS with no adjustment in subframe 1, a time adjustment of Ts/3 relative to subframe 1 in subframe 2 and a further adjustment of Ts/3 relative to subframe 2 in subframe 3), the effective sample time of the UE 601 will be Ts/3. As noted above, the controller 602.4 in the eNB 602 determines the time adjustment and instructs the transmitter 602.1 to transmit the PRS with the correct time adjustment.

An embodiment of a UE 101A according to an embodiment of the disclosure is described with reference to FIG. 8. In the UE 101A, an antenna 405A is provided which feeds the received PRS-carrying signal to an RF Front End 410A. As would be appreciated, the RF Front End 410A includes an amplifier module, a filter module, a downconverter module and a sampling module (not shown for clarity).

In this embodiment of the disclosure, an RF bandpass filter within the RF front end 410A has a bandwidth that scales with the effective sampling rate. For example:

With no timing adjustments, the bandwidth of the RF front end is $F_{base}$

When two timing adjustments are made (i.e. the effective sampling period is Ts/2, as shown in FIG. 7), the bandwidth of the RF front end is $2\times F_{base}$ By operation of the RF front-end at a higher bandwidth, more accurate resolution of the channel impulse response and hence more accurate RSTD measurement is provided.

It is realised by the inventors that the cost impact from the use of an RF front end with a higher bandwidth is quite small compared with operating with a higher sampling rate. Hence this embodiment of the disclosure is attractive from a cost perspective.

In an embodiment of the disclosure, the bandwidth of the RF front end is variable (e.g. through the use of a switched filter bank or the use of tuneable components in a filter contained within the RF front end). The use of a variable RF front end bandwidth allows for accurate resolution of the channel impulse response during positioning measurement occasions while reducing received noise power during reception of downlink data signals. This preserves the sensitivity of the received DL data signals.

The output from the RF Front End 410A is fed into an FFT module 415A. The FFT module 415A, channel estimation module 420A and the IFFT module 425A in FIG. 8 are similar in construction and arrangement as the FFT module 415, and a single channel estimation module 420A-N and a single the IFFT module 425A-N described in FIG. 4. It should be noted that, although only a single channel estimation module 420A and IFFT module 425A are shown in FIG. 8, in reality, one of these will be provided for each eNB from which the UE will receive a PRS signal.

Figure 8:
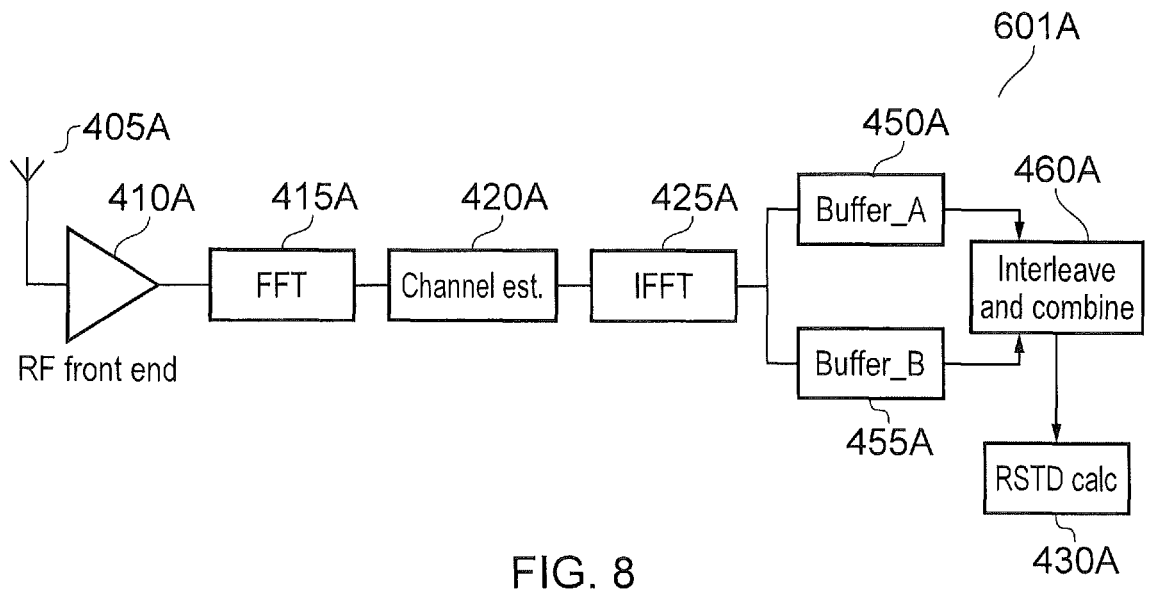
FIG. 8 shows a UE architecture according to embodiments.

The output from the IFFT module 425A in FIG. 8 is fed into two buffers; Buffer A 450A and buffer B 455A. Buffer A 450A stores channel impulse response values for the "no adjustment" timing alignment of FIG. 7. Buffer B 455A stores channel impulse response values for the "retard (or more generally adjust) by Ts/2" timing alignment of FIG. 7. The output from Buffer A and Buffer B is fed into an interleave and combine module 460A. The interleave and combine module 460A takes samples of the channel impulse response from buffer A 450A and interleaves them, according to the appropriate timing, with samples from buffer B in order to create the "shifted and combined channel impulse response" shown in graph 3 of FIG. 7. The output of the interleave and combine module 460A is fed into an RSTD calculation module 430A. The RSTD calculation module 430A is the same as the RSTD calculation module 430 of FIG. 4. The known RSTD calculations are then performed based on these "shifted and combined channel impulse responses".

It is expected that the RF Front End 410A will be part of the transmitter 601.1 and receiver 601.2 of the UE 601. The remaining modules within FIG. 8 will be part of the controller 601.4 of the UE 601.

Figure 4:
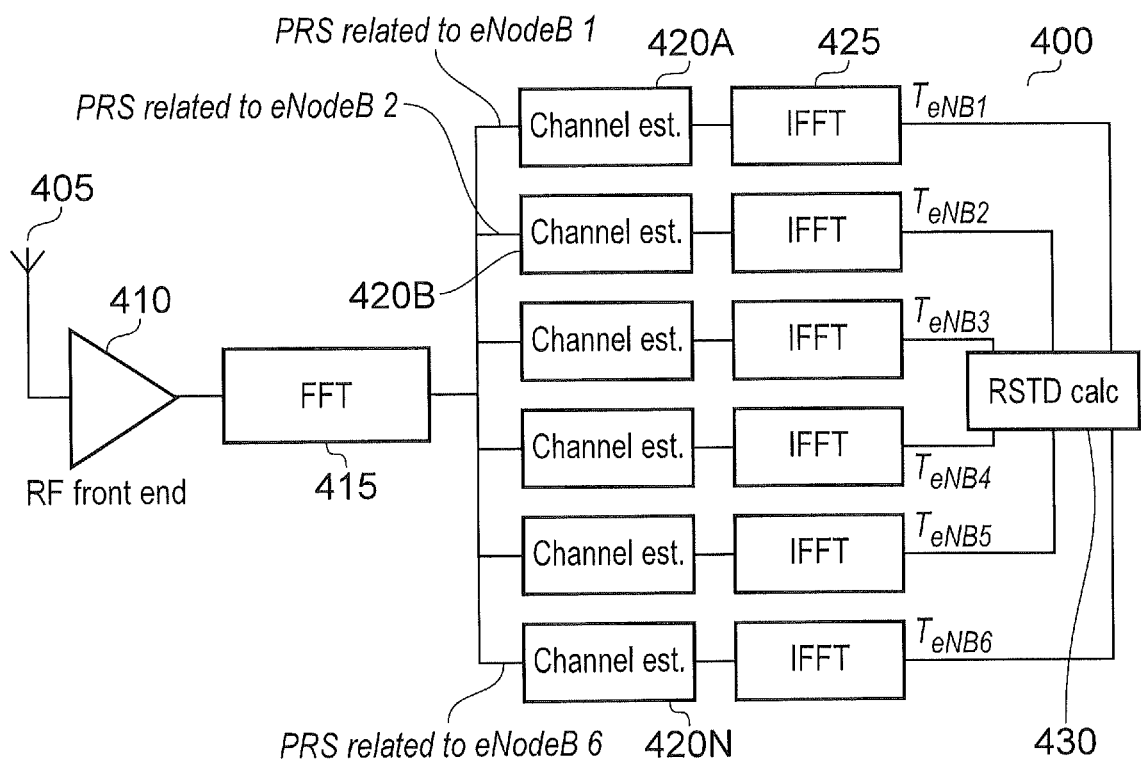
FIG. 4 shows a block diagram of a UE architecture for RSTD measurement based on time domain channel impulse response.
Figure 5:
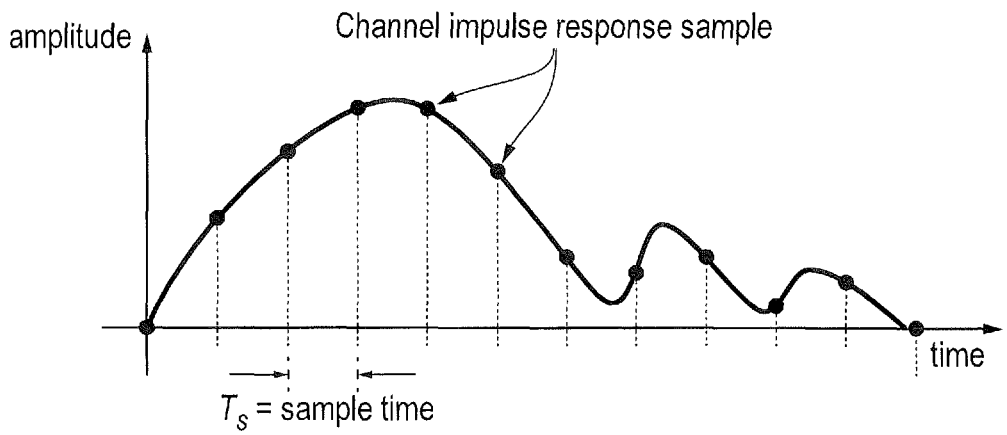
FIG. 5 shows an output of an Inverse Fast Fourier Transform module which shows amplitude as a function of time.
Figure 5:
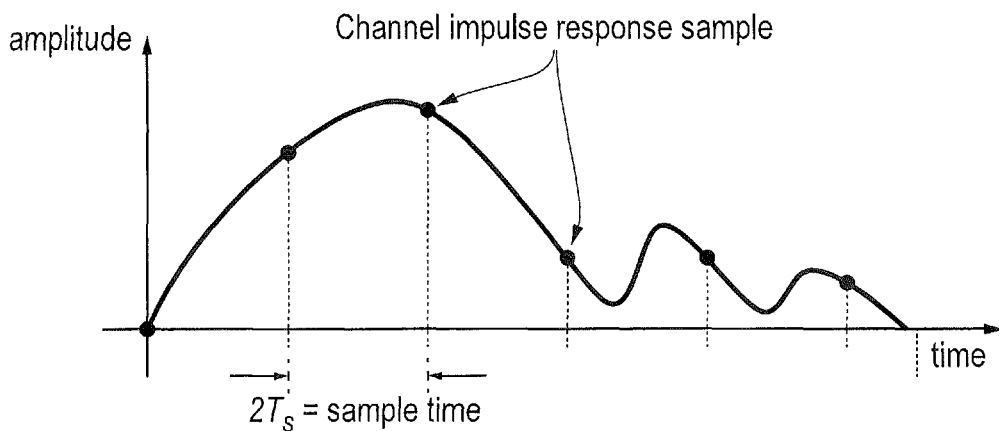
Figure 5:
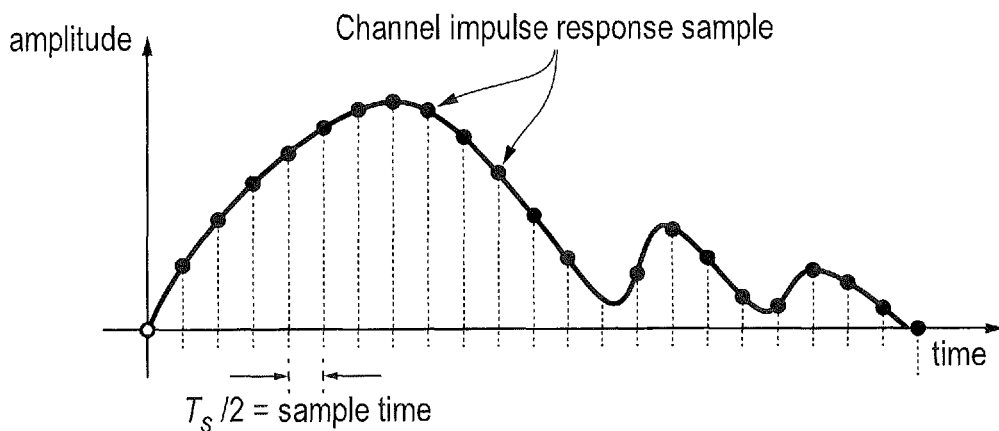

As noted above, for the sake of simplicity, FIG. 8 shows the receive chain for calculating a time delay for a single eNB and in practice, there may be multiple receive chains (multiple receive chains are shown in FIG. 4), one receive chain being applied to each eNB being measured.

In embodiments of the disclosure, the eNB frequency hops the PRS as well as performing timing adjustments on the transmitted signal. This allows the low sampling rate UE 601 to effectively mimic the RSTD performance of a wider bandwidth UE 601. This is because the UE 601 creates the same number of time and frequency domain samples as a wider bandwidth UE. In an embodiment, the eNB transmits differently time adjusted versions of the transmitted signal at a first frequency, then hops, and then transmits another set of differently time adjusted versions of the transmitted signal at a second frequency. To put it another way, the eNB transmits non-adjusted and adjusted subframes at a first hop and then transmits non-adjusted and adjusted subframes at a second hop. In the alternative, the eNB transmits non-adjusted subframes at the first hop and adjusted subframes at the second hop.

In embodiments of the disclosure, another UE architecture 601B is shown. In the UE architecture 601B of FIG. 9, an antenna 405B is coupled to an RF front End 410B. The antenna 405B and the RF Front End 410B are the same as the antenna 405A and the RF front end 410A of FIG. 8 and so will not be described in any more detail.

Figure 9:
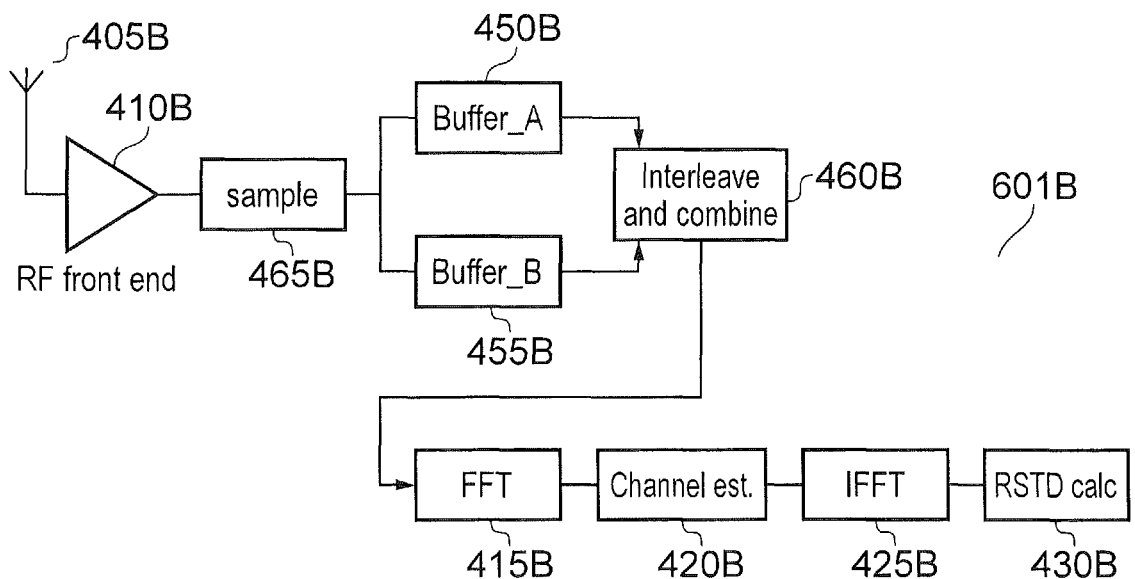
FIG. 9 shows another UE architecture according to embodiments.

The output of the RF Front End 410B is fed into a sample module 465B. The purpose of the sample module 465B is to sample and reorder samples that occur before the FFT function, as shown in FIG. 9. As noted above, the sample module 465B provides the sampling function after the RF front end 410B. This sampling function could be an ADC (analogue to digital converter) sampling function, for example operating at 320 kHz for an NB-IoT system. The samples are fed to two buffers; buffer A 450B and buffer B 455B. In a similar manner to the disclosure of FIG. 8, the PRS signal having no adjustment are provided to buffer A 450B and the PRS signal having a Ts/2 adjustment is provided to buffer B 455B. When all phases of the received signal (e.g. "no adjustment" and "retard (adjust) by Ts/2") have been sampled, the samples from the buffers are interleaved and combined in the interleave and combine module 460B to create a composite effectively oversampled signal. This allows the UE 601 to effectively oversample the received signal (before performing the FFT).

The output of the interleave and combine module 460B is fed into an FFT module 415B. The output of the FFT module 415B is fed to a channel estimator 420B. The output of the channel estimator 420B is fed to an inverse fast Fourier Transform module 425B and the output of the IFFT module 425B is fed to an RSTD calculation module 430B. The functionality of the FFT module, channel estimator, IFFT module and the RSTD module is the same as that described with reference to FIG. 8 and so will not be described further. However, as will be understood from the following, the effective sampling rate in the architecture of FIG. 9 will be higher.

With this arrangement, the UE 601 performs an FFT and subsequent processing functions on the effectively oversampled PRS signal. Note that the number of operations required on this effectively oversampled signal is greater than the number of operations required on the baseline signal. However it is realised that this is not a problem since the samples can be processed in non-real time in a processor-based architecture. Moreover, the present disclosure may be implemented on an architecture based on dedicated hardware which would iteratively process the increased number of samples. For example, consider an eMTC device that creates 128 samples within an OFDM symbol (and hence operates with a 128-point FFT). In this case, the UE 601 creates 128 samples on the non-adjusted signal and a further 128 samples of the time-adjusted signal, creating 256 samples overall. The UE 601 can then perform a 256 point FFT in order to create an over-sampled channel impulse response.

As noted above, the larger the number of dithering steps (i.e. the larger the number of time adjustments performed on the PRS signal), the finer the sampling granularity leading to a higher accuracy. However, this is subject to the radio channel being static during a cycle of different dithering steps.

Therefore in another embodiment, different sets of PRS are transmitted where each set has a different number of dithering steps. For a UE with fast changing radio conditions, the UE is assigned to the set of PRS with a lower number of dithering steps. Conversely, for a UE with slowly changing radio conditions, the UE is assigned to a set of PRS with a higher number of dithering steps.

Further, the greater the number of dithering steps, the lower the maximum speed that the system can tolerate. This is because if the channel changes significantly between subframes, a channel impulse response from one subframe cannot be interleaved with the channel impulse response from another subframe. This problem can be alleviated by the system making a coarse estimation of UE speed (either within the UE or within the core network) and assigning an appropriate number of dithering steps to the UE.

Alternatively, the controller 601.4 within the UE can measure whether the channel changes significantly between dithering steps and report based on an appropriate number of dithering steps. In this case, when the UE reports an RSTD measurement, it can also report the number of dithering steps over which that RSTD measurement was obtained.

IoT devices like eNB-IoT and feMTC are expected to operate in enhanced coverage. Under such operation, the PRS is expected to be repeated. Hence, in another embodiment, a repetition can be performed where in the first X subframes, the PRS is not dithered and in the subsequent Y subframes the PRS is dithered by a predefined amount. The UE can therefore combine the repetitive samples in X batches or Y batches as appropriate. It should be appreciated that the repetition can be longer than 2X where the cycling between dithered PRS and non-dithered PRS are cycled throughout the repetition. For example if there are K repetitions the number of cycles is K/NX where N is the number of different dithering steps. Hence the transmission of further position reference signals is dependent on the channel conditions (e.g. the receiver's SNR, being an indication of the required coverage enhancement for the UE).

In the above, the eNB changes (adjusts) the timing of the PRS transmission signal. However, it is possible for the UE 601 to change the phasing of the sampling signal to achieve the same effect. A diagram showing such an arrangement of a UE according to this embodiment is shown in FIG. 10.

Figure 10:
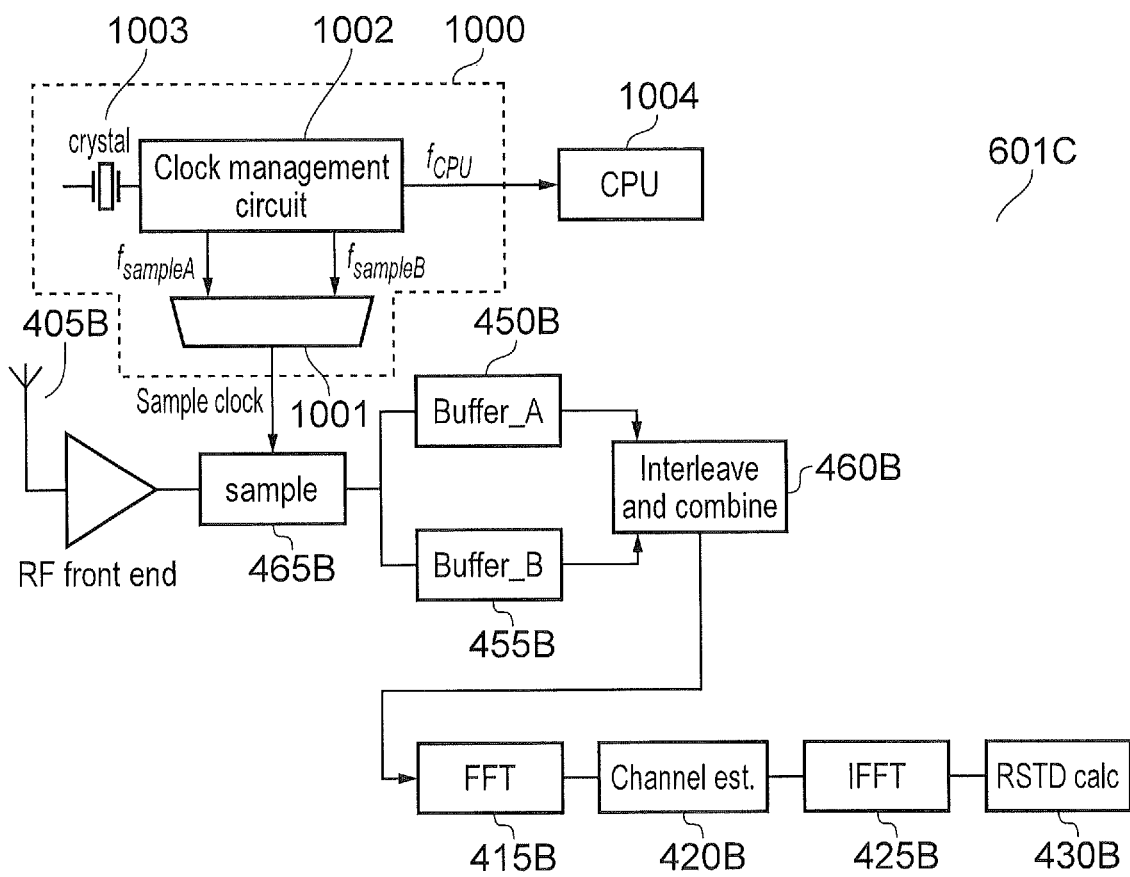
FIG. 10 shows another UE architecture according to embodiments.

As will be appreciated, the arrangement in FIG. 10 is similar to the arrangement of FIG. 9. The common features and modules will not be described for brevity. However, in the UE 601C of FIG. 10, the sample clock for the sample module 465B is generated using a clock generation module 1000. The provision of the clock generation module 1000 means that the eNB 602 does not need to perform any adjustment on the timing of the PRS signal.

In overview, the inventors have realised that many UE implementations use a higher system clock frequency than the sampling frequency of the PRS. For example, a UE may be implemented using a processor-based architecture where a CPU operates at a clock frequency of several hundreds of MHz while the received signal is sampled at a much lower rate. For example, 320 kHz in the case of NB-IoT. Such a UE implementation has a clock management function that creates clocks of various frequencies and may also create clocks of various phases. Hence various phases of a sampling clock may be created by the UE for general operation.

This is the basis for the UE based implementation. The UE 601 according to embodiments, generates different sampling phases for the received signal. For example, during a first subframe, the UE uses a first sampling phase (phase A) and during a second subframe, the UE uses a second sampling phase (phase B). This first and second sampling phase is generated by the clock generation module 1000 of FIG. 10. The oversampled signal is then processed according to the architecture shown in FIG. 8 or Error! Reference source not found.

Specifically, in the system of FIG. 8, the output of the clock generation module 1000 would sample the received PRS signal in the sampling module within the RF front end 410A. The output of the IFFT 425A will then be selectively fed to each of buffer_A 450A and buffer_B 455A. That is, the output of the IFFT 425A generated from phase A will be fed to buffer_A 450A and the output of the IFFT 425A generated from phase B will be fed to buffer_B 455A.

In FIG. 9, the output of the clock generation module 1000 would sample the received PRS signal in the sampling module 465B (which has been shown explicitly). The output of the sampling module 465B will then be selectively fed to each of buffer_A 450B and buffer_B 455B. That is, the output of the sampling module 465B generated from phase A will be fed to buffer_A 450B and the output of the sampling module 465B generated from phase B will be fed to buffer_B 455B.

The clock generation module 1000 will now be described with reference to FIG. 10. In the clock generation module 1000 of FIG. 10, a crystal oscillator 1003 provides an input to a clock management circuit 1002. An example oscillator may operate at a resonant frequency of 40.96 MHz. The clock management circuit 1002 doubles this frequency (e.g. via a phase locked loop) to provide a clock for a CPU 1004 of the UE 601. The CPU 1004 of the UE 601 may be the controller 601.4. The clock frequency of the CPU 1004 operates at a frequency of $f_{CPU}$=81.92 MHz. The clock management circuit 1002 also divides the crystal oscillator input to provide two clocks of 320 kHz, $f_{phaseA}$ and $f_{phaseB}$. Both of these clocks have a frequency of 320 kHz and have a difference in phase of 180 degrees. It is these two clocks that may be used in the embodiments of FIGS. 8 and 9 to generate the phase A and phase B signals.

One method of producing the two clocks is to invert the $f_{phaseA}$ signal (e.g. via an inverter) to produce the $f_{phaseB}$ clock. Of course, other methods of producing clocks of varying phases, including methods to create multiple phases of the clock, are envisaged.

The multiplexer chooses one of the two clocks $f_{phaseA}$ or $f_{phaseB}$ for different subframes, in order to sample the input signal at different times. The subsequent signal processing shown in this figure is the same as shown in FIG. 9.

The UE-based implementation of the disclosure explained with reference to FIG. 10 requires that the eNB 602 does not change the timing of its transmit signal for the duration over which the UE 601 creates the effective oversamples of the received signal. For example, if the UE 601 samples the signal with two clock phases during two consecutive subframes, the eNB 602 must not change the timing of the two subframes relative to one another.

In an embodiment, the UE 601 reports its capability, e.g. in terms of the number of clock phases (and hence subframes) it uses to derive RSTD measurements. This may be carried out when the UE sends an indication (for example capability signalling) message to the eNB. The eNB 602 can then:
- Transmit the signal appropriately to the UE. For example, maintaining timing for the appropriate number of subframes
- Determine the accuracy of the RSTD measurement reports from the UE 601. For example, if the eNB 602 is told that the UE 601 use two clock phases to sample the signal, it estimates that the UE's RSTD measurement accuracy is twice that of a UE that samples the signal with a single phase.

Alternatively, the UE 601 can report the number of clock phases it used to create the RSTD measurement in the message where the RSTD measurement is reported.

Figure 11:
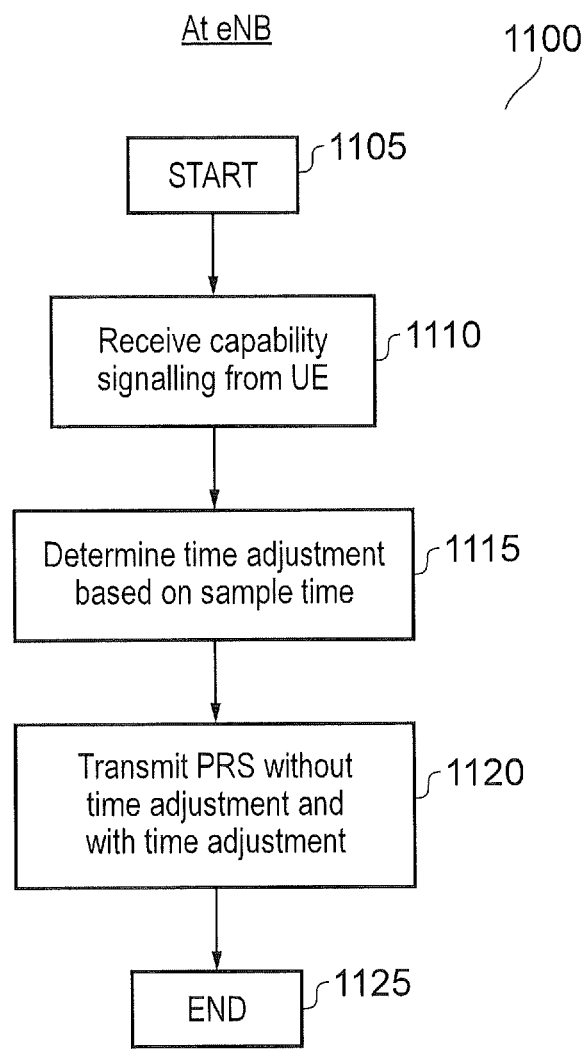
FIG. 11 shows a flowchart explaining a process at an eNB according to embodiments.

FIG. 11 shows a flowchart 1100 explaining a process at an eNB according to embodiments. The process 1100 starts at 1105. The eNB then receives the capability signal from the UE at step 1110. The capability signal provides an indication of the sample time used by the UE. The eNB therefore determines the time adjustment needed to be applied to the PRS based on the sample time in step 1115. The eNB then transmits the PRS without time adjustment in a first subframe and with appropriate time adjustment in a second subframe. This is step 1120 and the process ends in step 1125.

Figure 12:
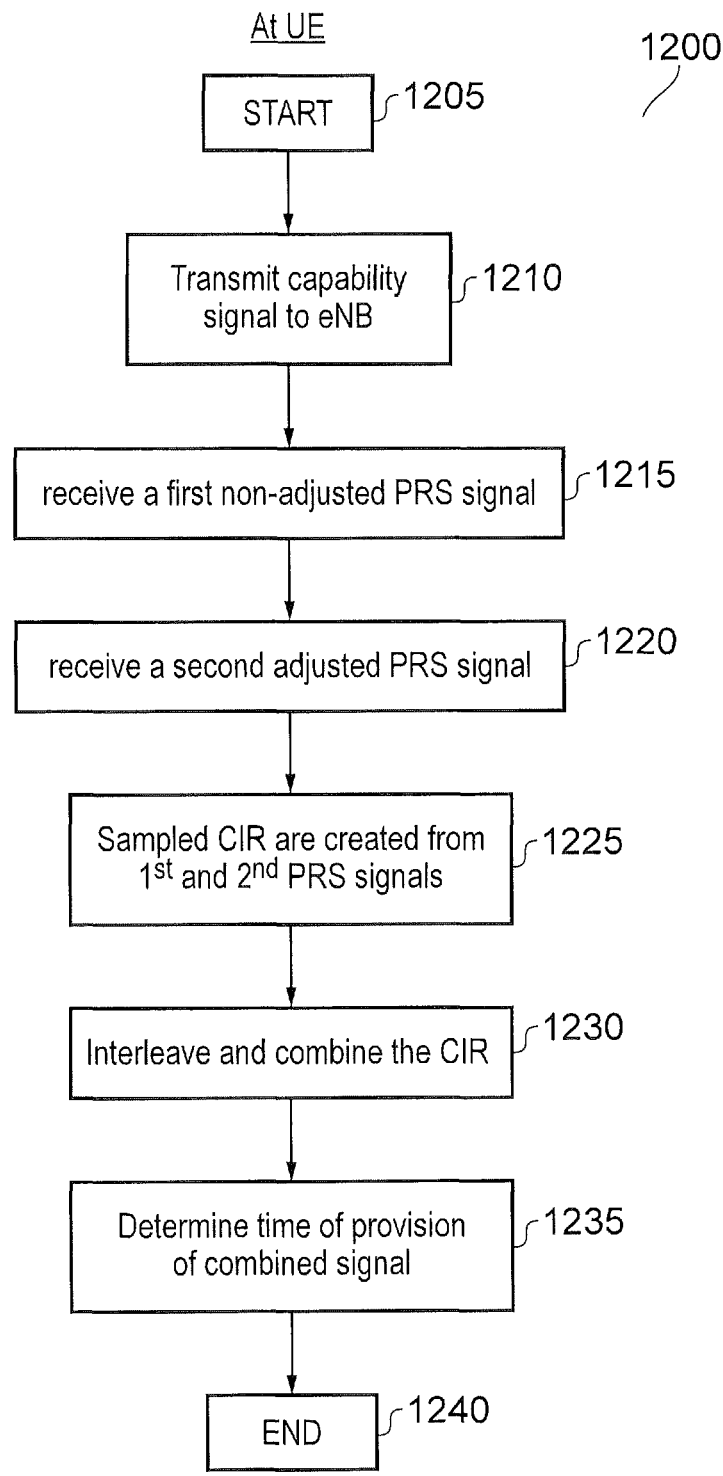
FIG. 12 shows a flowchart explaining a process at a UE according to embodiments.

FIG. 12 shows a flowchart 1200 explaining a process at a UE receiving a PRS from an eNB operating according to FIG. 11. The flowchart 1200 starts at step 1205. The UE transmits capability information to the eNB in step 1210. The first PRS signal which is non-time adjusted is received in step 1215. The second PRS signal which is time adjusted is received in step 1220. Sampled channel impulse responses (CIR) are created from the first and second PRS in step 1225. These channel impulse responses are interleaved and combined in step 1230. The time of provision of the combined signal is determined in step 1235 and the process ends in step 1240.

Figure 13:
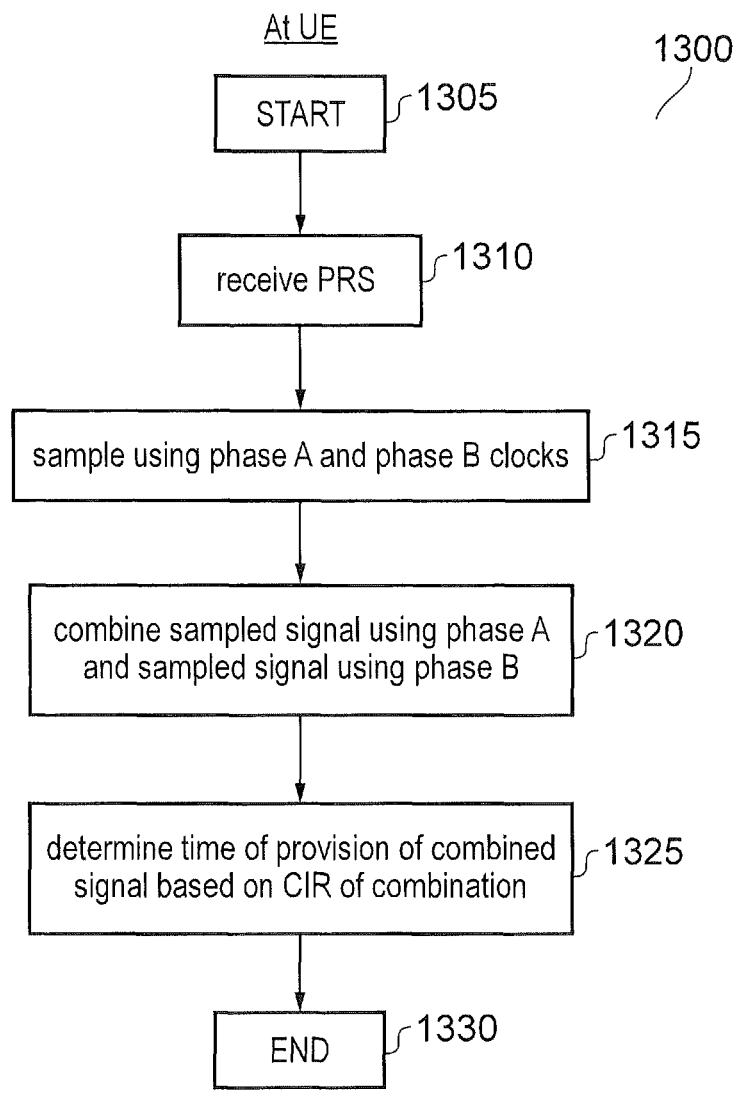
FIG. 13 shows a flowchart explaining a process at a UE according to other embodiments

FIG. 13 shows a flowchart 1300 explaining a process at a UE according to another embodiment. The process starts at step 1305. The PRS is received from the eNB in step 1310. The PRS signal is sampled using phase A and phase B clocks in step 1315. The samples created using the phase A clock and the samples created using the phase B clock are combined in step 1320. The time of provision of the combined signal is determined based on the channel impulse response of the combination in step 1325. The process ends in step 1330.

Although many of the examples above have been illustrated with a simple user equipment, the same teachings apply to a terminal which is not associated with any particular object or person, or associated with a pedestrian, a vehicle, a bicycle, a building or any other suitable object or person. In the case of an object, the terminal may be embedded in the object (e.g. a vehicle may comprise a mobile terminal in which a SIM card can be inserted), may be associated or paired with the object (e.g. a terminal may set up a Bluetooth connection with a Bluetooth module of the vehicle) or may simply be placed in a position wherein it is travelling with the object without having any particular communicative connection with the object (e.g. in the pocket of a driver or passenger in a vehicle).

Additionally, the method steps discussed herein may be carried out in any suitable order. For example, steps may be carried out in an order which differs from an order used in the examples discussed above or from an order used anywhere else for listing steps (e.g. in the claims), whenever possible or appropriate. Thus, in some cases, some steps may be carried out in a different order, or simultaneously or in the same order.

As used herein, transmitting information or a message to an element may involve sending one or more messages to the element and may involve sending part of the information separately from the rest of the information. The number of "messages" involved may also vary depending on the layer or granularity considered.

Also, whenever an aspect is disclosed in respect of an apparatus or system, the teachings are also disclosed for the corresponding method. Likewise, whenever an aspect is disclosed in respect of a method, the teachings are also disclosed for any suitable corresponding apparatus or system.

Whenever the expressions "greater than" or "smaller than" or equivalent are used herein, it is intended that they disclose both alternatives "and equal to" and "and not equal to" unless one alternative is expressly excluded.

It is noteworthy that even though the present disclosure has been discussed in the context of LTE, its teachings are applicable to but not limited to LTE or to other 3GPP standards. In particular, even though the terminology used herein is generally the same or similar to that of the LTE standards, the teachings are not limited to the present version of LTE and could apply equally to any appropriate arrangement not based on LTE and/or compliant with any other future version of an LTE or 3GPP or other standard.

Various further aspects and features of the present technique are defined in the appended claims. Various modifications may be made to the embodiments hereinbefore described within the scope of the appended claims. For example although LTE has been presented as an example application, it will be appreciated that other mobile communications systems can be used for which the present technique can be used.

Embodiments of the disclosure can be referred to generally in the following numbered paragraphs.

1. Infrastructure equipment for transmitting data to and receiving data from a mobile device on a communications network, the infrastructure equipment comprising:
  transmitter circuitry configured to transmit the data to the mobile device; and
  controller circuitry configured to control the transmitter circuitry to transmit a first position reference signal in a first subframe and a second position reference signal in a second subframe, wherein the second position reference signal is a time adjusted version of the first position reference signal, the amount of time adjustment being determined by the sample time at which the mobile device samples the position reference signal.

2. Infrastructure equipment according to clause 1, comprising receiver circuitry configured to receive data from the mobile device, and the controller is configured to control the receiver circuitry to receive capability signalling indicating the sample time from the mobile device.

3. Infrastructure equipment according to clause 1 or 2, wherein the controller circuitry is configured to control the transmitter circuitry to frequency hop the first and second position reference signal.

4. Infrastructure equipment according to clause 1 to 3, wherein the controller circuitry is configured to control the transmitter circuitry to transmit a plurality of further position reference signals, the time adjustment between each of the position reference signals being determined by the sample time and the number of position reference signals.

5. Infrastructure equipment according to clause 4, wherein the controller circuitry is configured such that the number of further position reference signals is dependent upon channel conditions to the mobile device.

6. Infrastructure equipment according to clause 4, wherein the controller circuitry is configured such that the number of further position reference signals is dependent upon the speed of the mobile device.

7. A mobile device for transmitting data to and receiving data from infrastructure equipment according to clause 1 to 6, the mobile device comprising:
   receiver circuitry configured to receive data from the infrastructure equipment; and
     controller circuitry configured to:
     control the receiver circuitry to receive the first position reference signal in the first subframe and the second position reference signal in the second subframe;
     sample the channel impulse response of the first position reference signal and the channel impulse response of the second position reference signal at the sampling rate;
     combine the sampled channel impulse response of the first position reference signal and the sampled channel impulse response of the second position reference signal to form a combined signal;
     and
     determine a time of provision of the combined signal based on the combination of the sampled channel impulse response of the first position reference signal and the sampled channel impulse response of the second position reference signal.

8. A mobile device according to clause 7, wherein the receiver circuitry comprises a bandpass filter having a variable bandwidth.

9. A mobile device according to clause 8, wherein the bandwidth scales in accordance with the sample rate.

10. A mobile device according to clause 7 to 9, further wherein the controller circuitry is configured to store the sampled channel impulse response of the first position reference signal in a first buffer and to store the sampled channel impulse response of the second position reference signal in a second buffer and to produce the combined signal.

11. A mobile device for transmitting data to and receiving data from infrastructure equipment according to clause 1 to 6, the mobile device comprising:
   receiver circuitry configured to receive data from the infrastructure equipment; and
     controller circuitry configured to:
     control the receiver circuitry to receive the first position reference signal in the first subframe and the second position reference signal in the second subframe;
     sample the received first position reference signal and the second position reference signal at the sample rate;
     store the sampled first position reference signal in a first buffer and the sampled second position reference signal in a second buffer;
     combine the sampled first position reference signal and the second position reference signal to form a combined signal; and
     determine a time of provision of the combined signal based on the channel impulse response of the combined signal.

12. A mobile device for transmitting data to and receiving data from infrastructure equipment on a communications network, the mobile device comprising:
   receiver circuitry configured to receive the data from the infrastructure equipment; and
     controller circuitry configured to:
     control the receiver circuitry to receive a position reference signal from the infrastructure equipment;
     sample the received position reference signal at a sample rate using a sample clock operating in a first phase to generate a first sample signal in a first subframe and in a second phase to generate a second sample signal in a second subframe, the first and second phase being different;
     store the first sampled signal in a first buffer and the sampled second signal in a second buffer;
     combine the first sampled signal and the second sampled signal to form a combined signal; and
     determine a time of provision of the combined signal based on the channel impulse response of the combined signal.

13. A method of operating infrastructure equipment for transmitting data to and receiving data from a mobile device on a communications network, the method comprising:
   transmitting a first position reference signal in a first subframe and a second position reference signal in a second subframe, wherein the second position reference signal is a time adjusted version of the first position reference signal, the amount of time adjustment being determined by the sample time at which the mobile device samples the position reference signal.

14. A method according to clause 13, comprising receiving capability signalling indicating the sample time from the mobile device.

15. A method according to clause 13 or 14, comprising frequency hopping the first and second position reference signal.

16. A method according to clause 13 to 15, comprising transmitting a plurality of further position reference signals, the time adjustment between each of the position reference signals being determined by the sample time and the number of position reference signals.

17. A method according to clause 16, wherein the number of further position reference signals is dependent upon channel conditions to the mobile device.

18. A method according to clause 16, wherein the number of further position reference signals is dependent upon the speed of the mobile device.

19. A method of controlling a mobile device for transmitting data to and receiving data from infrastructure equipment according to clause 1 to 12, the method comprising:

receiving the first position reference signal in the first subframe and the second position reference signal in the second subframe;

sampling the channel impulse response of the first position reference signal and the channel impulse response of the second position reference signal at the sampling rate;

combining the sampled channel impulse response of the first position reference signal and the sampled channel impulse response of the second position reference signal to form a combined signal; and determining a time of provision of the combined signal based on the combination of the sampled channel impulse response of the first position reference signal and the sampled channel impulse response of the second position reference signal.

20. A method according to clause 19, comprising applying a bandpass filter having a variable bandwidth to the received signals.

21. A method according to clause 20, wherein the bandwidth scales in accordance with the sample rate.

22. A method according to clause 19 to 21, comprising storing the sampled channel impulse response of the first position reference signal in a first buffer and storing the sampled channel impulse response of the second position reference signal in a second buffer and to produce the combined signal.

23. A method of controlling a mobile device for transmitting data to and receiving data from infrastructure equipment according to clause 1 to 12, the method comprising:

receiving the first position reference signal in the first subframe and the second position reference signal in the second subframe;

sampling the received first position reference signal and the second position reference signal at the sample rate;

storing the sampled first position reference signal in a first buffer and the sampled second position reference signal in a second buffer;

combining the sampled first position reference signal and the second position reference signal to form a combined signal; and determining a time of provision of the combined signal based on the channel impulse response of the combined signal.

24. A method of controlling a mobile device for transmitting data to and receiving data from infrastructure equipment on a communications network, the method comprising:

receiving a position reference signal from the infrastructure equipment;

sampling the received position reference signal at a sample rate using a sample clock operating in a first phase to generate a first sample signal in a first subframe and in a second phase to generate a second sample signal in a second subframe, the first and second phase being different;

storing the first sampled signal in a first buffer and the sampled second signal in a second buffer;

combining the first sampled signal and the second sampled signal to form a combined signal; and determining a time of provision of the combined signal based on the channel impulse response of the combined signal.

25. Circuitry for transmitting data to and receiving data from a mobile device on a communications network, the circuitry comprising:

a transmitter module configured to transmit the data to the mobile device; and a controller module configured to control the transmitter circuitry to transmit a first position reference signal in a first subframe and a second position reference signal in a second subframe, wherein the second position reference signal is a time adjusted version of the first position reference signal, the amount of time adjustment being determined by the sample time at which the mobile device samples the position reference signal.

26. Circuitry for transmitting data to and receiving data from infrastructure equipment on a communications network, the circuitry comprising:

a receiver module configured to receive the data from the infrastructure equipment; and a controller module configured to:

control the receiver circuitry to receive a position reference signal from the infrastructure equipment;

sample the received position reference signal at a sample rate using a sample clock operating in a first phase to generate a first sample signal in a first subframe and in a second phase to generate a second sample signal in a second subframe, the first and second phase being different;

store the first sampled signal in a first buffer and the sampled second signal in a second buffer;

combine the first sampled signal and the second sampled signal to form a combined signal; and determine a time of provision of the combined signal based on the channel impulse response of the combined signal.

27. A computer readable storage medium configured to store computer readable instructions which, when loaded onto a computer, configure the computer to perform a method according to claim 13.

REFERENCES

[1] RP-161324, "New work item proposal: Enhancements of NB-IoT," Vodafone, Huawei, HiSilicon, Ericsson, Qualcomm, RAN #72

[2] RP-161321, "New WI proposal on Further Enhanced MTC", Ericsson, RAN #72

The invention claimed is:

1. Infrastructure equipment for transmitting data to and receiving data from a mobile device on a communications network, the infrastructure equipment comprising:

transmitter circuitry configured to transmit the data to the mobile device; and controller circuitry configured to control the transmitter circuitry to transmit a first position reference signal in a first subframe and a second position reference signal in a second subframe, wherein the second position reference signal is a time adjusted version of the first position reference signal, the amount of time adjustment being determined by dividing the sample time at which the mobile device samples the position reference signal a number of time adjustments to be made plus one.

2. Infrastructure equipment according to claim 1, comprising receiver circuitry configured to receive data from the mobile device, and the controller is configured to control the receiver circuitry to receive capability signalling indicating the sample time from the mobile device.

3. Infrastructure equipment according to claim 1, wherein the controller circuitry is configured to control the transmitter circuitry to frequency hop the first and second position reference signal.

4. Infrastructure equipment according to claim 1, wherein the controller circuitry is configured to control the transmitter circuitry to transmit a plurality of further position reference signals, the time adjustment between each of the position reference signals being determined by the sample time and the number of position reference signals.

5. Infrastructure equipment according to claim 4, wherein the controller circuitry is configured such that the number of further position reference signals is dependent upon channel conditions to the mobile device.

6. Infrastructure equipment according to claim 4, wherein the controller circuitry is configured such that the number of further position reference signals is dependent upon the speed of the mobile device.

7. A method of operating infrastructure equipment for transmitting data to and receiving data from a mobile device on a communications network, the method comprising:

transmitting a first position reference signal in a first subframe and a second position reference signal in a second subframe, wherein the second position reference signal is a time adjusted version of the first position reference signal, the amount of time adjustment being determined by dividing the sample time at which the mobile device samples the position reference signal a number of time adjustments to be made plus one.

8. A method according to claim 7, comprising receiving capability signalling indicating the sample time from the mobile device.

9. A method according to claim 7, comprising frequency hopping the first and second position reference signal.

10. A method according to claim 7, comprising transmitting a plurality of further position reference signals, the time adjustment between each of the position reference signals being determined by the sample time and the number of position reference signals.

11. A method according to claim 10, wherein the number of further position reference signals is dependent upon channel conditions to the mobile device.

12. A method according to claim 10, wherein the number of further position reference signals is dependent upon the speed of the mobile device.

\* \* \* \* \*